Figure 1:
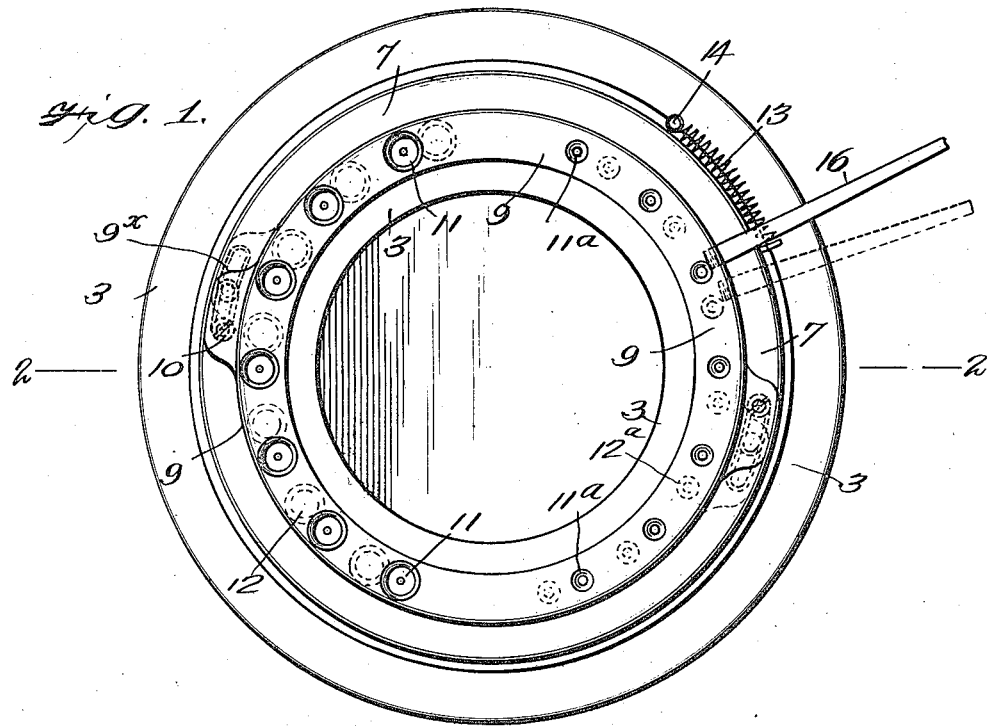

H. LONG.
MOLD FOR GLASS SPARK PLUGS AND CORES.
APPLICATION FILED JULY 1, 1914.

1,153,126.

Patented Sept. 7, 1915.
3 SHEETS—SHEET 1.

WITNESSES
F. C. Barry
L. H. Stanley

INVENTOR
Harry Long
BY Munn & Co
ATTORNEYS

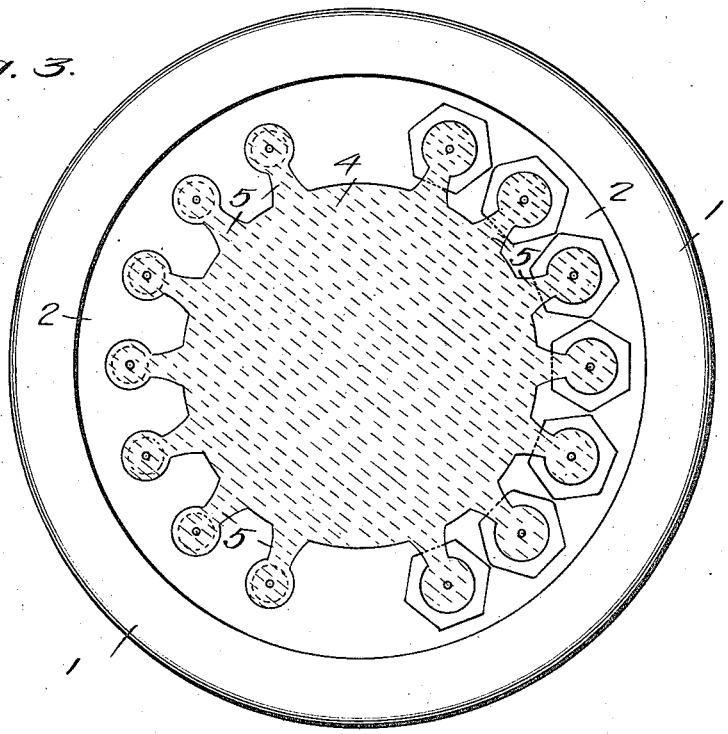
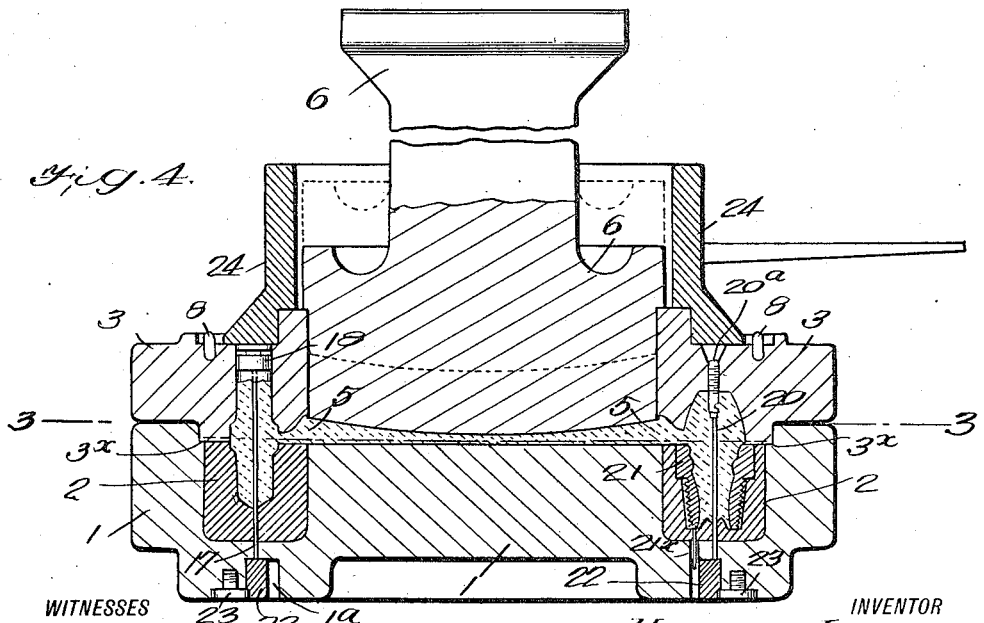

H. LONG.
MOLD FOR GLASS SPARK PLUGS AND CORES.
APPLICATION FILED JULY 1, 1914.
1,153,126.
Patented Sept. 7, 1915.
3 SHEETS—SHEET 3.
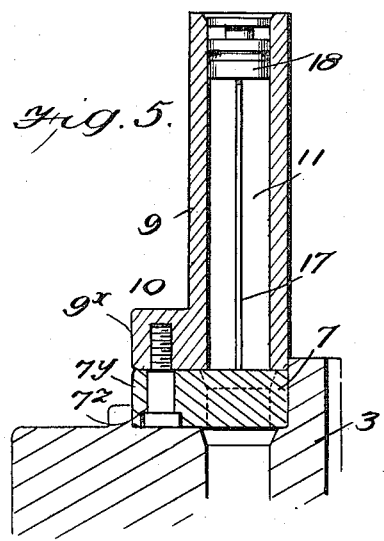
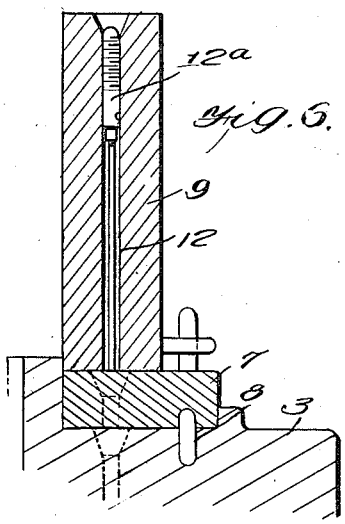
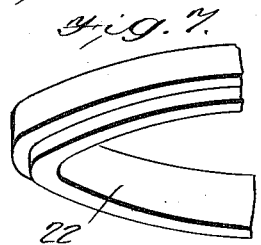
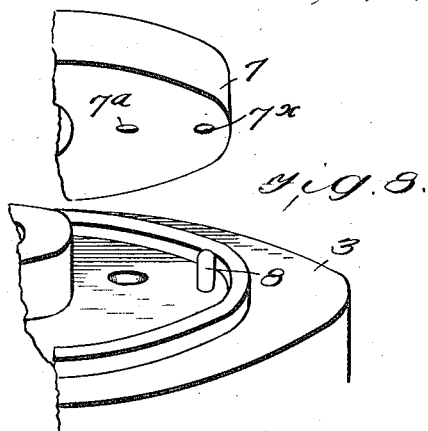
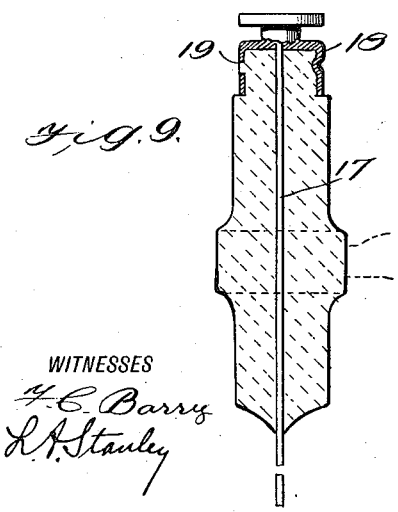
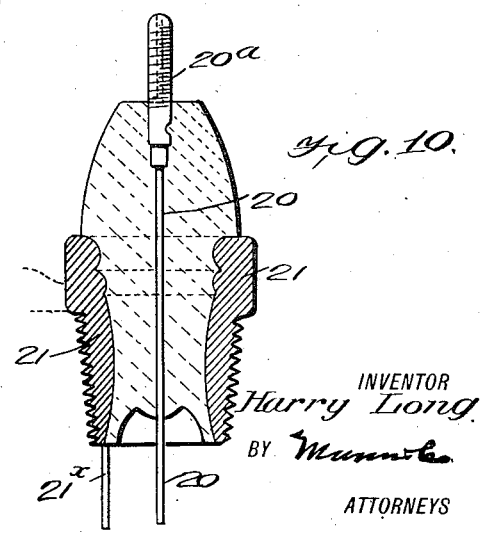
WITNESSES
H. C. Barry
L. A. Stanley
INVENTOR
Harry Long
BY Munn & Co.
ATTORNEYS

UNITED STATES PATENT OFFICE.

HARRY LONG, OF KOKOMO, INDIANA.

MOLD FOR GLASS SPARK-PLUGS AND CORES.

1,153,126.  Specification of Letters Patent.  Patented Sept. 7, 1915.

Application filed July 1, 1914. Serial No. 848,373.

*To all whom it may concern:*

Be it known that I, HARRY LONG, a citizen of the United States, and a resident of Kokomo, in the county of Howard and State of Indiana, have made certain new and useful Improvements in Molds for Glass Spark-Plugs and Cores, of which the following is a specification.

My invention relates to improvements in molds for forming pressed glass spark plugs and spark plug cores, and it consists in the combinations, constructions and arrangements herein described and claimed.

An object of my invention is to provide a mold in which glass spark plugs or glass spark plug cores may be made accurately and in a minimum of time.

A further object of my invention is to provide a device in which the conducting members such as the wires for the terminals may be centered and held in position during the molding operation.

Further objects and advantages will appear in the following specification and the novel features of the invention will be particularly pointed out in the appended claims.

My invention is illustrated in the accompanying drawings, forming part of this application, in which similar reference characters indicate like parts in the several views and in which—

Figure 2:
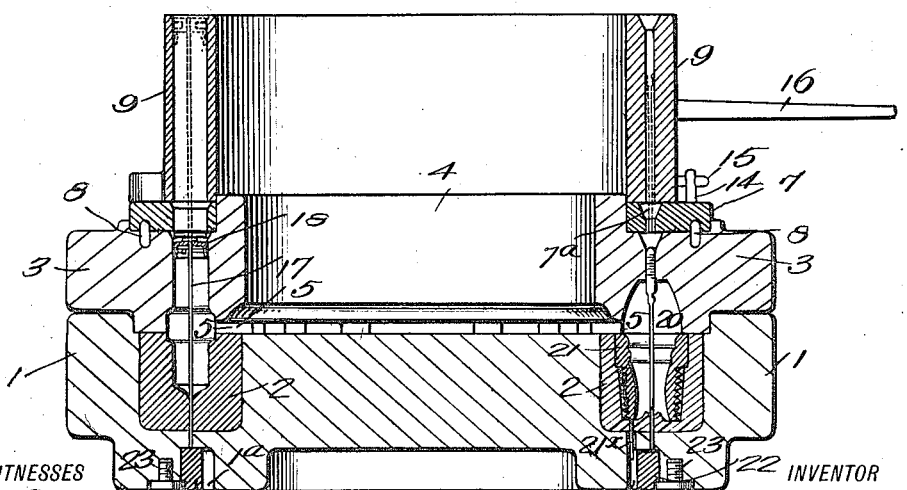

Figure 1 is a plan view of the mold showing the magazine in position thereon. Fig. 2 is a section along the line 2—2 of Fig. 1, the plunger being removed. Fig. 3 is a section on the line 3—3 of Fig. 4. Fig. 4 is a section through the mold showing the latter filled with the glass. Fig. 5 is a detail section through a portion of the magazine. Fig. 6 is a section through another portion of the magazine. Fig. 7 is a perspective view of a portion of the electro adjusting sleeve. Fig. 8 is a perspective detail view showing the relation of the body ring to the magazine. Fig. 9 is a section through a completed spark plug core. Fig. 10 is a section through a completed spark plug.

In carrying out my invention I provide a body portion 1 which is preferably made of chilled cast iron and as will be seen from the drawings it is provided with an annular channel for receiving a base holder 2 which is also preferably made of cast iron and which is machined to fit into the body portion 1. Arranged to rest on the body portion 1 is a body ring 3 which is provided with an annular flange $3^x$ arranged to fit into a groove at the upper part of the body portion 1. The body ring 3 and the base holder 2 are drilled and reamed for cores as shown at the left hand side of Figs. 2 and 4 or for spark plugs as shown at the right hand side, the reamed or drilled recesses in the body ring registering with those in the base holder. As will be seen from Fig. 2 the interior of the body ring 3 forms a well 4 which is provided with gates 5 leading into the recesses into which the glass is designed to flow for molding the articles to be manufactured. A plunger 6 of suitable material such as chilled cast iron is machined to accurately fit within the body ring 3 so as to exert pressure on the glass in the well 4.

In Figs. 5 and 6 I have shown portions in detail of the magazine. These consist of a base portion 7 which may be mounted in the top of the body ring 3 and which is provided with holes such as that shown at $7^x$ in Fig. 8. The body ring 3 bears guide pins such as that shown at 8 which are arranged to enter the openings $7^x$ so as to prevent the rotation of the base member 7 with respect to the body ring.

The upper part of the magazine consists of a cylindrical member 9 which is provided with a flange $9^x$ arranged to register with a flange $7^y$ of the base portion. The flange $9^x$ is provided with a screw 10 which is arranged to extend through an arc-shaped slot $7^z$ in the base member 7. This screw holds the members 7 and 9 together but it permits a rotary movement of the member 9 with respect to the member 7. The member 9 is reamed or drilled to provide holders 11 for the metal terminals and caps of the cores and for the conducting portions of the cores. Smaller bores 12 are provided for holding the central conducting wire of the spark plugs, the latter being attached to the usual screw terminal $20^a$. A spring such as that shown at 13 is attached to a post 14 on the base portion 7, the opposite end of the spring being attached to a pin 15 on the upper portion 9 of the magazine. The base portion 7 is provided with openings $7^a$ arranged to register with the openings or bores 12 and $12^a$ respectively in the member 9. Normally the openings are not in registration, but are in the position shown in Fig. 1. A handle 16 is attached to the upper member 9 so as to move the latter around its central axis thereby bringing the bores 12 and 12ª into registration with the openings 7ª. When the handle is released the spring 13 moves the base portion 7 so as to bring the openings out of registration.

As will be seen from the drawings the bores in the body ring 3 are disposed beneath and are adapted to register with the bores 7ª in the lower magazine member 7. The screw 10 in the slot 7ˣ limits the movement of the upper magazine member 9 with respect to the lower magazine member 7, as will be explained later.

In Fig. 9 I have shown a finished spark plug core. It will be observed that the core has a central conducting wire 17 which is attached to a metal cap 18, the latter having an opening 19.

In Fig. 10 the spark plug has a central conducting wire 20 whose upper end is secured to a screw terminal 20ª. Hollow screw plugs, such as that shown at 21, form the exterior portion of the plug.

Referring again to Figs. 2 and 4 I have shown therein an electrode adjusting ring 22, which is held in a recess 1ª in the body portion 1 by means of screws 23.

From the foregoing description of the various parts of the device the operation thereof may be readily understood. The base holder 2 is first filled with the screw plug bases 21 and then the base holder is placed in position in the main body portion 1. The body ring 3 is then put in position above the base holder. The magazine is filled with the metal parts of the spark plug and spark plug cores such as those shown at 17, 18, 20 and 20ª, the lower ends of the conducting wires 17 and 20 resting upon the upper surface of the base portion 7, the openings in which it will be remembered are kept normally out of alinement by means of the spring 13. Now by moving the handle 16 from the position shown in full lines in Fig. 1 to that shown in dotted lines the openings in the upper portion 9 are brought into alinement with those in the portion 7 of the magazine and also with those in the body ring 3 whereupon the metal parts will drop down by gravity into the positions which they will take in the finished article. In Figs. 2 and 4 it will be seen that the base holders 2 and the body portion 1 are provided with centrally disposed openings so as to permit the conducting terminals 17 and 20 to pass through until they engage the terminal adjusting ring 22, thereby holding the central metal conducting portions at the proper height. Openings are also provided in these members for the admission of the second spark plug terminal 21ˣ. The magazine which consists, as stated before, of the members 9 and 7, is now removed and a spring-plate closing sleeve 24 is now substituted for the magazine and rests on the top of the body ring 3 in the manner clearly shown in the drawing. The purpose of this member 24 is to prevent the electrodes from an upward movement while the operation of pressing the glass is taking place. Molten glass is now put into the well 4 and the plunger 6 is now operated through any suitable means which causes the glass to flow through the gates 5 into the interior of the mold closing around the central conductors 20 and 17. It will be noted that the opening 19 in the side of the cap 18 provides an air vent for the glass. It also provides a means of securely locking the cap to the glass when the latter is cold. The screw terminal 20ª in the spark plug is also provided with an opening which extends preferably through the top of the plug, as shown in dotted lines in Fig. 10, so as to give the air a chance to escape. When the operation of pressing is completed the plunger 6 is withdrawn, the spring-plate closing sleeve 24 is removed, the body ring 3 is lifted out, as is also the base holder 2 which contains the pressed glass spark plug and pressed glass spark plug cores. After they have been annealed they are cracked off at the portions which have hardened in the gates 5, from the surplus of glass formed in the wall 4.

I desire to call especial attention to the fact that the use of the magazine results in several decided advantages. In the actual operation of the device, six magazines are required for a complete equipment to one body mold. The mold must be worked hot, and as soon as one magazine is withdrawn another is replaced, and thus the mold is capable of turning out a great deal more work than if the parts were placed directly in the mold each time. Furthermore, the placing of the parts directly in the mold would hinder the presser in charge of operating the mold. Again, when the parts are placed in the magazine, the latter is cold or rather at such a temperature as not to interfere with the rapid placing of the parts or the burning of the operator, whereas, on the other hand, the mold is hot. Obviously, the placing of the parts directly in the mold could not be accomplished with the ease, safety, and celerity as when the magazine is used.

I claim:

1. In a molding device, a base provided with recesses, a surmounting body ring provided with recesses arranged to register with those in the base, means for establishing communication between the interior of the ring and the registering recesses, a magazine surmounting said body ring, said magazine being provided with bores normally out of registration with the recesses in said base and said body ring, and means for moving a portion of the magazine to bring its openings into alinement with those in the base and body ring.

2. In a molding device, a base provided with recesses, a surmounting body ring provided with recesses arranged to register with those in the base, means for establishing communication between the interior of the ring and the registering recesses, a magazine surmounting said body ring, said magazine consisting of an upper portion having vertically extending bores normally out of alinement with the recesses in said base and said body ring, and a lower portion disposed between said upper portion and said body ring and having openings normally in alinement with bores in the base and body ring, said upper portion being movable relatively to said lower portion to bring the openings in alinement with the bores in the lower portion.

3. In a molding device, a base provided with recesses, a surmounting body ring provided with recesses arranged to register with those in the base, means for establishing communication between the interior of the ring and the registering recesses, a magazine surmounting said body ring, said magazine consisting of an upper portion having vertically extending bores normally out of alinement with the recesses in said base and said body ring, and a lower portion disposed between said upper portion and said body ring and having openings normally in alinement with bores in said base and body ring, said upper portion being movable relatively to said lower portion to bring the openings in alinement with the bores in the lower portion, and engaging portions on said upper and said lower magazine members for limiting the movement of said upper portion of the magazine member in one direction.

4. In a molding device, a base provided with recesses, a surmounting body ring provided with recesses arranged to register with those in the base, means for establishing communication between the interior of the ring and the registering recesses, a magazine surmounting said body ring, said magazine consisting of an upper portion having vertically extending bores normally out of alinement with the recesses in said base and said body ring, and a lower portion disposed between said upper portion and said body ring and having openings normally in alinement with bores in said base and body ring, said upper portion being movable relatively to said lower portion to bring the openings in alinement with the bores in the lower portion, engaging portions on said upper and said lower magazine members for limiting the movement of said upper portion of the magazine member in one direction, and a spring for returning the movable portion of the magazine to its normal position.

5. In a molding device for glass spark plugs and spark plug cores, a base provided with a series of recesses, a body ring surmounting the ring and provided with recesses arranged to register with those in the base, a magazine surmounting said body ring and provided with bores arranged to receive metal conducting members, and means for simultaneously permitting the metal conducting members to fall by gravity into the registering bores of the base and the body ring.

6. In a molding device for glass spark plugs and spark plug cores, a base provided with a series of recesses, a body ring surmounting the ring and provided with recesses arranged to register with those in the base, a magazine surmounting said body ring and provided with bores arranged to receive metal conducting members, means for simultaneously permitting the metal conducting members to fall by gravity into the registering bores of the base and the body ring, and means carried by the base for limiting the downward movement of the conducting members.

7. In a molding device for glass spark plugs and spark plug cores, a base provided with a series of recesses, a body ring surmounting the ring and provided with recesses arranged to register with those in the base, a magazine surmounting said body ring and provided with bores arranged to receive metal conducting members, means for simultaneously permitting the metal conducting members to fall by gravity into the registering bores of the base and the body ring, means carried by the base for limiting the downward movement of the conducting members, said last named means comprising openings in the base for permitting the passage of the conducting members, and a stop member carried by the base on the under side thereof for limiting the downward movement of the conducting members.

8. In a mold for spark plugs, a base portion provided with an annular channel on its upper side, a spark plug base holder arranged to fit in said channel, a body ring surmounting said base and said spark plug base holder; said body ring and said spark plug base holder being provided with registering recesses, the central portion of the body ring forming a glass well, conduits connecting said glass well with the recesses in the body ring, a magazine disposed above said body ring for holding metal conducting members, and means for moving the portion of said magazine to cause the simultaneous delivery of the metal conducting parts into the recesses in the body ring and spark plug base holder.

9. In a mold for glass spark plugs and spark plug cores, a base portion provided with a series of recesses disposed in circular arrangement, a body ring surmounting said base portion and having a series of recesses arranged to register with those in the base portion, a magazine comprising an upper portion adapted to be rotated around the common axis of the base and body ring and being provided with a series of bores arranged in circular relation and normally out of alinement with the recesses in the body ring and base but adapted to be brought into alinement by the rotation around the common axis.

HARRY LONG.

Witnesses:
 JOE M. LONG,
 JAMES C. BLACKLIDGE.